United States Patent
Faroudja

[11] Patent Number: 6,111,610
[45] Date of Patent: Aug. 29, 2000

[54] DISPLAYING FILM-ORIGINATED VIDEO ON HIGH FRAME RATE MONITORS WITHOUT MOTIONS DISCONTINUITIES

[75] Inventor: Yves C. Faroudja, Los Altos Hills, Calif.

[73] Assignee: Faroudja Laboratories, Inc., Sunnyvale, Calif.

[21] Appl. No.: 08/993,547

[22] Filed: Dec. 18, 1997

Related U.S. Application Data

[63] Continuation-in-part of application No. 08/988,722, Dec. 11, 1997, abandoned.

[51] Int. Cl.[7] .................................................... H04N 7/01
[52] U.S. Cl. ........................ 348/441; 348/441; 348/443; 348/459; 348/458; 358/140
[58] Field of Search ...................... 348/97, 441, 443, 348/459, 445, 448, 449, 455, 458; 358/140

[56] References Cited

U.S. PATENT DOCUMENTS

| | | | |
|---|---|---|---|
| 4,876,596 | 10/1989 | Faroudja | 358/140 |
| 4,967,271 | 10/1990 | Campbell et al. | 358/105 |
| 4,982,280 | 1/1991 | Lyon et al. | 358/105 |
| 4,989,090 | 1/1991 | Campbell et al. | 358/140 |
| 4,998,167 | 3/1991 | Jaqua | 358/140 |
| 5,115,311 | 5/1992 | Jaqua | 358/140 |
| 5,159,451 | 10/1992 | Faroudja | 358/140 |
| 5,191,427 | 3/1993 | Richards et al. | 358/214 |
| 5,255,091 | 10/1993 | Lyon et al. | 358/140 |
| 5,260,787 | 11/1993 | Capitant et al. | 350/140 |
| 5,291,280 | 3/1994 | Faroudja | 348/416 |
| 5,365,280 | 11/1994 | De Haan et al. | 348/699 |
| 5,398,071 | 3/1995 | Gove et al. | 348/558 |
| 5,418,572 | 5/1995 | Nonweiler et al. | 348/446 |
| 5,517,248 | 5/1996 | Isoda | 348/459 |
| 5,550,592 | 8/1996 | Markandey et al. | 348/448 |
| 5,596,371 | 1/1997 | Pakhchyan et al. | 348/452 |
| 5,796,439 | 8/1998 | Hewett et al. | 348/459 |
| 5,892,550 | 4/1999 | Iwasaki et al. | 348/443 |

FOREIGN PATENT DOCUMENTS

WO9524100   9/1995   WIPO .

*Primary Examiner*—John K. Peng
*Assistant Examiner*—Paulos Natnael
*Attorney, Agent, or Firm*—Gallagher & Lathrop; Thomas A. Gallagher

[57] ABSTRACT

In arrangements for the frame rate upconversion of motion-picture-source video, a 60 Hz (interlaced field rate or progressive scan frame rate) television signal is converted to a form suitable for display on a variable-frame-rate high-resolution progressively-scanned monitor of the type typically associated with a computer or with a television set employing an increased frame rate. The inherent 3-2 motion picture film pulldown pattern in the source signal is changed to an equal time frame pattern, such as 3-3, 4-4, or 5-5, when the source signal is converted to a higher frame rate. This may be accomplished when the increased progressively-scanned video display frame rate is an integral multiple of the motion picture frame rate, namely 72 Hz, 96 Hz and 120 Hz.

24 Claims, 7 Drawing Sheets

FIG._1A (PRIOR ART) Film

FIG._1B (PRIOR ART) Input Video 60 Hz 2/1

FIG._1C (PRIOR ART) De-Interlaced Video 60 Hz

FIG._1D (PRIOR ART) Frame Doubled De-Interlaced Video 120 Hz

FIG._2A Film
FIG._2B Frame Doubled De-Interlaced Video 120 Hz
FIG._2C 3-2 Sequence Marker
FIG._2D Blank Frame
FIG._2E Repeat Frame
FIG._2F Output

FIG._4A  Film

FIG._4B  Frame Doubled De-Interlaced Video 120 Hz

FIG._4C  One Frame Delay

FIG._4D  Switching Control

FIG._4E  Output

FIG._6A  Film
FIG._6B  60 Hz Progressive
FIG._6C  72 Hz Compressed
FIG._6D  One Frame Delay
FIG._6E  Output

FIG._8A  Film

FIG._8B  60 Hz Progressive

FIG._8C  96 Hz Compressed

FIG._8D  One Frame Delay

FIG._8E  Two Frame Delay

FIG._8F  Output

DISPLAYING FILM-ORIGINATED VIDEO ON HIGH FRAME RATE MONITORS WITHOUT MOTIONS DISCONTINUITIES

This is a continuation-in-part of application No. 08/988,722, filed Dec. 11, 1997, abandoned.

FIELD OF THE INVENTION

The present invention relates to television signal processing. More particularly, the present invention relates to improved signal processing apparatus and methods for displaying film-originated video signals, having a nominal 60 Hz interlaced field rate or progressively scanned frame rate, on high frame rate monitors, such as high-resolution television and computer-type monitors, without motion discontinuities.

DESCRIPTION OF RELATED ART

The present invention is concerned with improvements in converting motion-picture-film-source television signals for display on computer-type monitors and television sets (including those having projection type displays) having increased frame rate displays, particularly frame rates of 72 Hz, 96 Hz and 120 Hz. The source television signal may be any type of video signal either interlaced, having a nominally 60 Hz field rate, or progressively scanned, having a nominally 60 Hz frame rate. Such sources include, for example, standard NTSC television signals, 525-line monochrome (interlaced) television signals, digital component television signals, and various types of interlaced and progressively scanned HDTV formats such as those having 480, 720 and 1090 lines. The display is progressively-scanned, in which case the source signal, if interlaced, is de-interlaced. Many techniques for de-interlacing or interlaced to progressive scan conversion are known in the prior art. The display may also have a different line rate from the source, in which case line rate conversion may also be employed. Many techniques for increasing line rates are known in the prior art.

One application of the present invention is for advanced NTSC television sets. It is possible, for example, that future NTSC television sets will have a 120 Hz frame display rate if a 100 Hz frame display rate is adopted in Europe in order to overcome the PAL system's 50 Hz flicker that is particularly noticeable when large screen, high contrast displays are employed. In that case, in order to use the same television production lines for NTSC and PAL television sets, 120 Hz displays are likely to be adopted for NTSC sets even though there is substantially no flicker problem in 60 Hz NTSC due to the higher NTSC frame rate.

It is known, for example, to derive a 120 Hz frame rate progressively scanned video signal from a 60 Hz field rate interlaced NTSC video source. Such conversion devices typically begin by de-interlacing the nominally 60 Hz NTSC source (although 59.94 Hz in practice, it will be referred to as 60 Hz herein). A preferred way to de-interlace an interlaced NTSC television signal whose source is a 24 fps (frame per second) motion picture film is to merge opposite polarity pairs of interlaced fields derived from the same motion picture film source frame (computer animated video, derived from a progressively scanned source and converted to interlaced form also constitute a "film source"). Each such merged pair, constituting a new deinterlaced frame, is repeated at least twice, preserving the 3-2 "pull down" pattern, so that the deinterlaced signal has a frame rate the same as the original interlaced television field rate and each de-interlaced frame has more horizontal scan lines than in each original interlaced television field. Field merging deinterlacers typically produce progressively-scanned frames in which there are substantially twice the number of horizontal scan lines as in each original interlaced television field. However, the number of horizontal scan lines may be increased even further, if desired, using other known techniques such as line repetition and line interpolation.

The deinterlaced 60 Hz progressive scan signal, maintaining the 3-2 film pattern present in the original interlaced 60 Hz signal, is then frame doubled to a nominal 120 Hz frame rate. Various techniques for frame doubling are well known in the art. The frame doubled signal also maintains the film pattern, which becomes a 6-4 pattern as a result of the frame doubling. As a result there will be a visible motion discontinuity in the displayed picture due to the 6-4 pattern sequence as two film frames succeeding each other will be alternately displayed for $\frac{1}{30}$ and $\frac{1}{20}$ second.

Figure 1A:
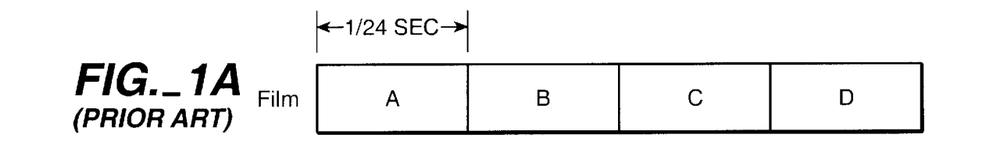
FIGS. 1A–D are idealized timing information charts useful in understanding the operation of prior art frame doublers.
Figure 1B:
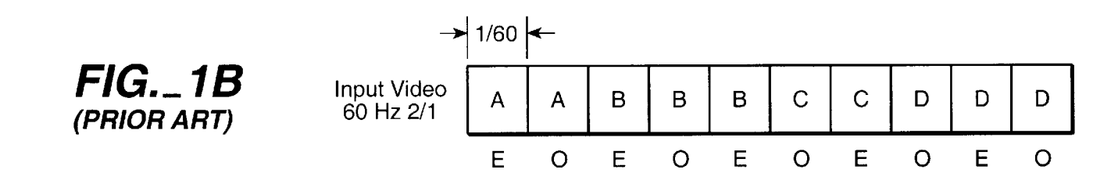

FIG. 1A depicts a portion of a conventional 24 fps motion picture film having consecutive frames A, B, C and D. A 24 frame/second motion picture film is applied to and synchronized with 60 Hz NTSC video by using a 3-2 film pulldown ratio such that three video fields come from one film frame and the subsequent two video fields come from the next film frame (e.g., AABBBCCDDD, etc., where "A," "B," etc. are successive film frames). This is shown in FIG. 1B. "E" and "O" indicate even and odd interlaced television fields.

It is known to detect that a nominally 60 Hz NTSC television signal has a film source. For example, in accordance with U.S. Pat. No. 4,876,976, video fields of the same parity in adjacent video frames are compared. When motion is present, a distinctive repeating pattern is obtained only if the video source is film (i.e., 1101111011, etc., where "1" indicates motion and "0" indicates no motion). Related techniques and other techniques for detecting a film source in video signals are disclosed in U.S. Pat. Nos. 4,876,596; 4,967,271; 4,982,280; 4,989,090; 4,998,167; 5,255,091; 5,159,451; 5,291,280; 5,365,280; 5,398,071; and Published International Application WO 95/24100. Each of the United States Patents identified in this paragraph is hereby incorporated by reference in its entirety.

Figure 1C:
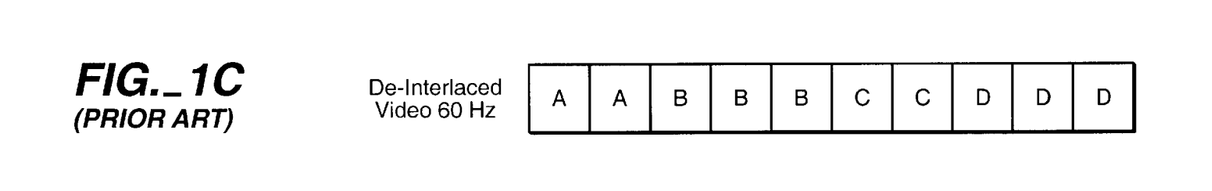

FIG. 1C shows deinterlaced progressively scanned video frames having the same 3-2 film pulldown pattern. Deinterlacing (i.e., interlaced-to-progressive-scan conversion) is performed by merging pairs of interlaced fields derived from the same motion picture film frame when the original video source is a film source. In order to do so, the deinterlacer may include a film-source detector or a film-source identification signal may be transmitted along with the television signal. Such deinterlacers, per se, are known in the prior art. A progressively scanned output frame is produced for every interlaced input field. Each progressively scanned output frame, being the merging of two fields, typically has at least twice the number of horizontal lines as each input field. Such a deinterlacer is often referred to in the art as a "line doubler." The number of lines may be increased further to achieve line tripling or line quadrupling, if desired.

For the case of a nominally 60 Hz interlaced scanned input signal, the deinterlaced progressively-scanned video has a frame rate the same as the nominally 60 Hz interlaced field rate. In addition, the frames have the same 3-2 pattern. That is, three identical progressively-scanned frames (corresponding to one original film frame) followed by two identical progressively-scanned frames (corresponding to the next original film frame), etc.

A suitable commercially available deinterlacer capable of handling PAL (and NTSC) inputs and providing the proper progressively-scanned output is the Model LD100 Line Doubler, marketed by Faroudja Laboratories, Inc. of Sunnyvale, Calif.

Figure 1D:
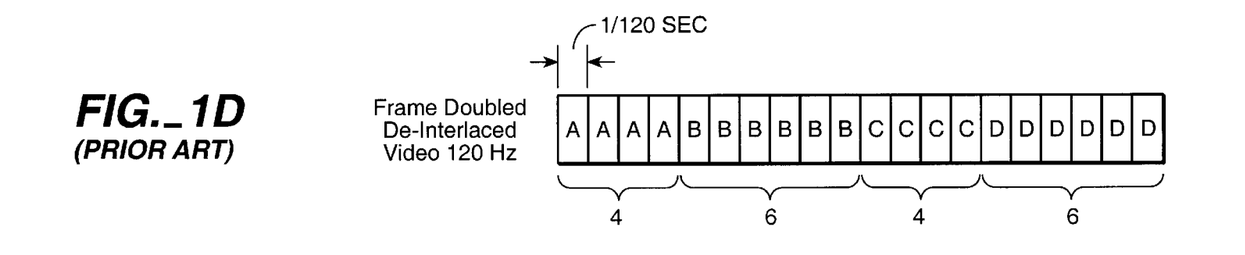

FIG. 1D shows the result of doubling the frame rate of the 60 Hz progressive scan video signal of FIG. 1C. The result is a progressively scanned video signal having a 120 Hz frame rate and maintaining the 3-2 pulldown sequence (now a 6-4 pattern). Consequently, adjacent film frames are alternately displayed for $\frac{1}{30}$ and $\frac{1}{20}$ second, causing a visible motion discontinuity.

Thus, there is an unsatisfied need for a simple, inexpensive technique, substantially free of motion discontinuities, for converting motion-picture-film-source television signals for frame rate increased displays.

SUMMARY OF THE INVENTION

In accordance with the present invention, a nominally 60 Hz (interlaced field rate or progressive scan frame rate) television signal is converted to a form suitable for display on a variable-frame-rate high-resolution progressively-scanned monitor of the type typically associated with a computer or with a television set employing an increased frame rate. The invention is directed to the frame rate upconversion of motion-picture-source video, it being understood that other video sources may be converted in accordance with any of various known techniques. Various techniques for detecting whether or not a video source is motion picture film are well known in the art, as set forth above.

In accordance with the invention, the inherent 3-2 pattern in the source signal is changed to an equal time frame pattern when the source signal is converted to a higher frame rate. The invention is based on the recognition that this may be accomplished when the increased progressively-scanned video display frame rate is an integral multiple of the motion picture frame rate, namely 72 Hz, 96 Hz and 120 Hz (although higher rates are possible, they are not practical).

In its 120 Hz environment embodiments, the apparatus of the invention includes an interlaced-to-progressive scan converter if if the video source signal is interlaced. In that case, the apparatus includes a 60 Hz 2-1 interlaced to 60 Hz progressive scan converter receiving a film-originated video signal having a 3-2 pulldown pattern and putting out a 60 Hz progressively scanned video signal maintaining the 3-2 pulldown pattern. The nominally 60 Hz scanning format converted signal or the original nominally 60 Hz input video signal, if originally in progressive scan format, is applied to 60 Hz to 120 Hz frame rate doubler which puts out a nominally 120 Hz video signal maintaining the 3-2 pulldown pattern as a 6-4 pattern that is in turn processed by a frame repeater, deleter and substituter that deletes the first or last one of the frames in each of the six frame sequences and repeats and substitutes therefore one of the adjacent frames in each of the adjacent four frame sequences. The result is that five 120 Hz frames display every motion picture film frame, thus providing equal film frame display times (equal to the original film frame time of $\frac{1}{24}$ second).

The invention is also applicable to 72 Hz and 96 Hz display rates. Both may be implemented in two ways. One approach requires frame doubling to 120 Hz, the other does not.

A first embodiment of apparatus for converting to a 72 Hz frame rate includes an interlaced-to-progressive scan converter if the video source signal is interlaced. In that case, the apparatus includes a 60 Hz 2-1 interlaced to 60 Hz progressive scan converter receiving a film-originated video signal having a 3-2 pulldown pattern and putting out a 60 Hz progressively scanned video signal maintaining the 3-2 pulldown pattern. The nominally 60 Hz scanning format converted signal or the original nominally 60 Hz input progressively-scanned video signal is applied to 60 Hz to 120 Hz frame rate doubler which puts out a nominally 120 Hz video signal maintaining the 3-2 pulldown pattern as a 6-4 pattern that is in turn processed by a frame deleter and expander that deletes four frames in each of the ten frame 6-4 sequences, namely one frame of the four sequence portion and three frames of the six sequence portion, and time expands the remaining six frames from $\frac{1}{120}$ seconds each to $\frac{1}{72}$ seconds each.

If a sequence of ten 120 Hz video frames are labeled A1-A2-A3-A4-B1-B2-B3-B4-B5-B6 (where each respective "A" and "B" frame carry the same respective film frame and the numerals identify each consecutive video frame position), then A3, B1, B4 and B6 may be discarded and the remaining frames time expanded from $\frac{1}{60}$ to $\frac{1}{72}$ seconds to provide a 72 Hz frame rate video stream having the frame sequence A1-A2-A4-B2-B3-B5. Frame rate conversion schemes usable to provide such functions are well known in the art.

Figure 10:
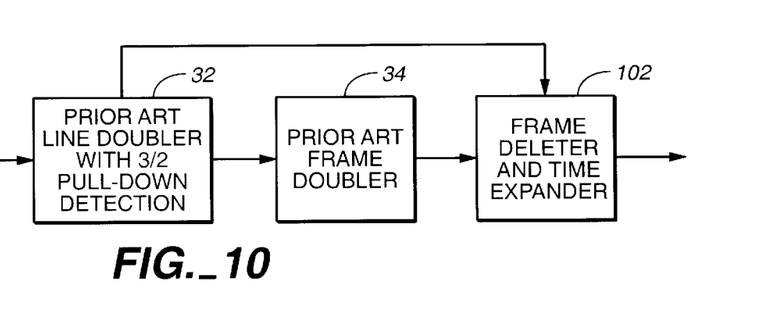
FIG. 10 is a functional block diagram of an embodiment of the invention providing 72 Hz or 96 Hz display.

FIG. 10 shows a functional block diagram of an embodiment for implementing the just described method. The input video, which may be 60 Hz 2-1 interlaced video, preferably is applied to a line doubler 32 of the prior art field-merge type, which, for film sources, merges the interlaced fields in order to provide a 60 Hz progressively scanned video signal, thereby increasing the number of lines and functioning as an interlace-to-progressive scan converter. Line doubler 32 includes 3-2 pull down detection and also provides a 3-2 sequence marker signal as shown in FIG. 2C. The line doubled 60 Hz progressively scanned signal is applied to a prior art frame doubler 34, which generates a 120 Hz frame rate video signal (FIG. 2B). The 3-2 pull down sequence is present in the outputs of blocks 32 and 34. Under control of the 3-2 sequence marker, block 102, a frame deleter and time expander, receives the 120 Hz signal, deletes four frames and time expands the remaining frames to provide a 72 Hz frame rate video stream.

A second, simpler, embodiment of apparatus for converting to a 72 Hz frame rate includes an interlaced-to-progressive scan converter if the video source signal is interlaced. Whether the input signal is interlaced and converted to progressive or the input signal is in progressive format, the signal, having a nominal 60 Hz frame rate and the 3-2 pulldown pattern is applied to a frame repeater and compressor that compresses each frame in a five frame 3-2 sequence from $\frac{1}{60}$ to $\frac{1}{72}$ seconds and repeats one of the frames in the 2 sequence portion of the 3-2 sequence.

In both embodiments, the 72 Hz conversion apparatus provides a video stream in which every film frame is represented by three 72 Hz video frames, thus displaying every film frame for $\frac{1}{24}$ seconds, the display rate of the original film frame.

A first embodiment of apparatus for converting to a 96 Hz frame rate includes an interlaced-to-progressive scan converter if the video source signal is interlaced. In that case, the apparatus includes a 60 Hz 2-1 interlaced to 60 Hz progressive scan converter receiving a film-originated video signal having a 3-2 pulldown pattern and putting out a 60 Hz progressively scanned video signal maintaining the 3-2 pulldown pattern. The nominally 60 Hz scanning format converted signal or the original nominally 60 Hz input progressive video signal is applied to 60 Hz to 120 Hz frame rate doubler which puts out a nominally 120 Hz video signal maintaining the 3-2 pulldown pattern as a 6-4 pattern that is in turn processed by a frame deleter and expander that deletes two of the frames in each of the ten frame 6-4 sequences, namely two frames in the six sequence portion, and expands the remaining eight frames from $\frac{1}{120}$ seconds each to $\frac{1}{96}$ seconds each.

For example if a sequence of ten 120 Hz video frames are labeled A1-A2-A3-A4-B1-B2-B3-B4-B5-B6 (where each respective "A" and "B" frame carry the same respective film frame and the numerals identify each consecutive video frame position), then B1 and B6 may be discarded and the remaining frames time expanded from $\frac{1}{60}$ to $\frac{1}{96}$ seconds to provide a 96 Hz frame rate video stream having the frame sequence A1-A2-A3-A4-B2-B3-B4-B5. Frame rate conversion schemes usable to provide such functions are well known in the art.

FIG. 10 shows a functional block diagram of an embodiment for implementing the just described method. For the case of this 96 Hz embodiment, under control of the 3-2 sequence marker, block 102, a frame deleter and time expander, receives the 120 Hz signal, deletes two frames and time expands the remaining frames to provide a 96 Hz frame rate video stream.

A second, simpler, embodiment of apparatus for converting to a 96 Hz frame rate may also include an optional scanning format converter. Whether the input signal is interlaced and converted to progressive or the input signal is in progressive format, the signal, having a nominal 60 Hz frame rate and the 3-2 pulldown pattern is applied to a frame repeater and compressor that compresses each frame in a five frame 3-2 sequence from $\frac{1}{60}$ to $\frac{1}{96}$ seconds and repeats two of the frames in the 2 sequence portion of the 3-2 sequence and one of the frames in the 3 sequence portion of the 3-2 sequence.

In both embodiments, the 96 Hz conversion apparatus provides a video stream in which every film frame is represented by four 96 Hz video frames, thus displaying every film frame for $\frac{1}{24}$ seconds, the display rate of the original film frame.

In all of the embodiments, line doubling (or some other increase in the number of lines) may be employed to provide more lines in the displayed picture than were present in the original input signal. When interlaced to progressive scan conversion is employed, a preferred form of progressive scan conversion, field merging, results in line doubling.

DESCRIPTION OF THE PREFERRED EMBODIMENTS

Throughout this document, the input field rates or the input frame rates are "nominally" 60 Hz in that the input signal source may be a relatively unstable consumer quality videocassette player (such as a VHS format consumer player or recorder/player). Moreover, even a stable broadcast "60 Hz" field rate NTSC signal has an actual field rate of 59.94 Hz. Thus, the precise field or frame rate of the input signal is not critical and may vary over a range at least as great as that produced by consumer video sources. Consequently, progressive scan frame rates derived from such input sources are only nominally at 72 Hz, 96 Hz and 120 Hz, for example, and are subject to increased variations due to scaling upward in frame rate.

Figure 2A:
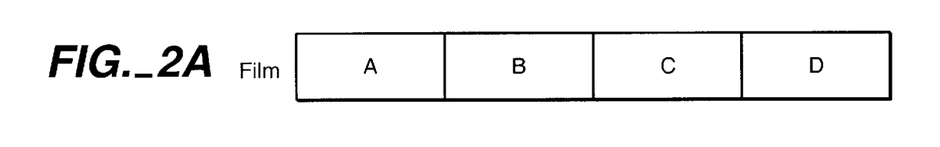
FIGS. 2A–F are idealized timing information charts useful in understanding the operation of a first embodiment of the present invention for a nominally 120 Hz display.
Figure 2B:
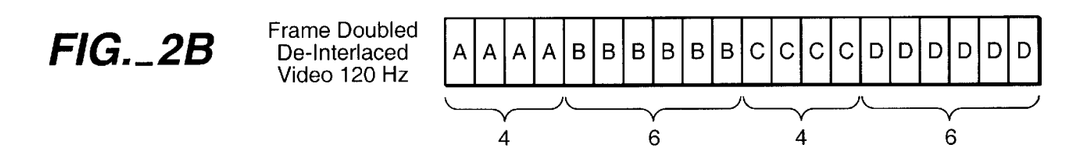
Figure 2C:
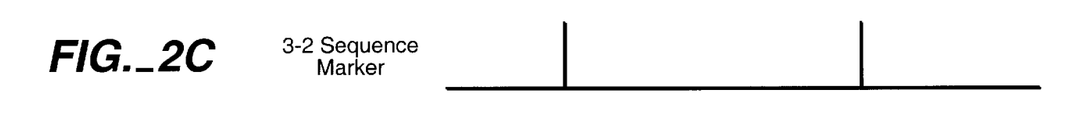
Figure 2D:
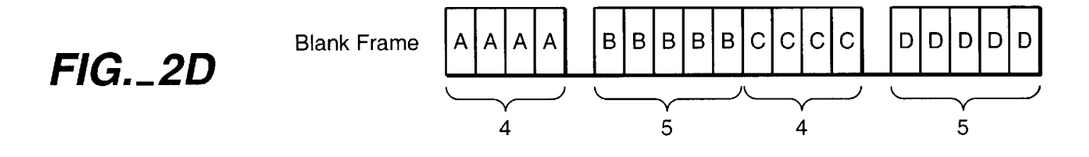
Figure 2E:
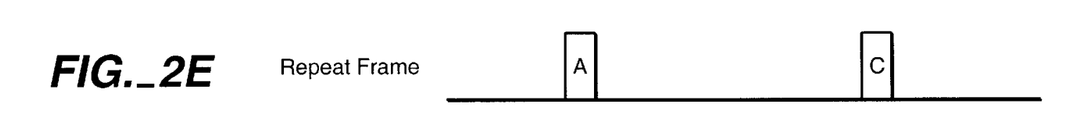
Figure 2F:
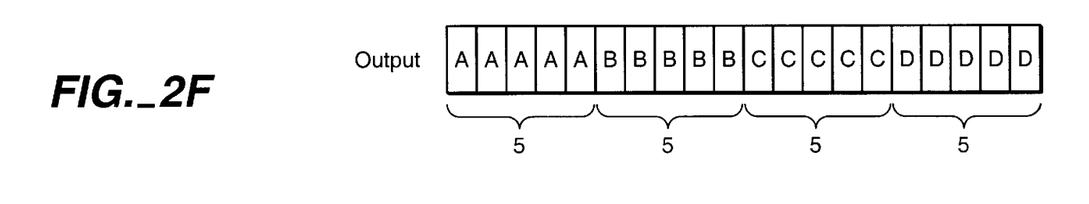

The sequence of FIGS. 2A–2F explain a first embodiment of the present invention in which equal film frame display times (equal to the original film frame time of $\frac{1}{24}$ second) are achieved in a 120 Hz frame rate progressively scanned display video signal. FIGS. 2A and 2B correspond to FIGS. 1A and 1D and are repeated for simplicity in presentation. The 3-2 (6-4) film pulldown pattern may be divided by 3-2 sequence markers shown in FIG. 2C. By creating a first video signal stream in which every frame following a marker is blanked (FIG. 2D) and creating a second video stream in which the last frame preceding each marker is delayed and repeated (FIG. 2E), the two video streams may be summed in order to provide a frame doubled video stream in which there are the same number of video frames for every film frame (FIG. 2F). The resulting 5- 5 pattern provides $\frac{1}{24}$ second display for every film frame (each film frame is carried by five video frames).

Figure 3:
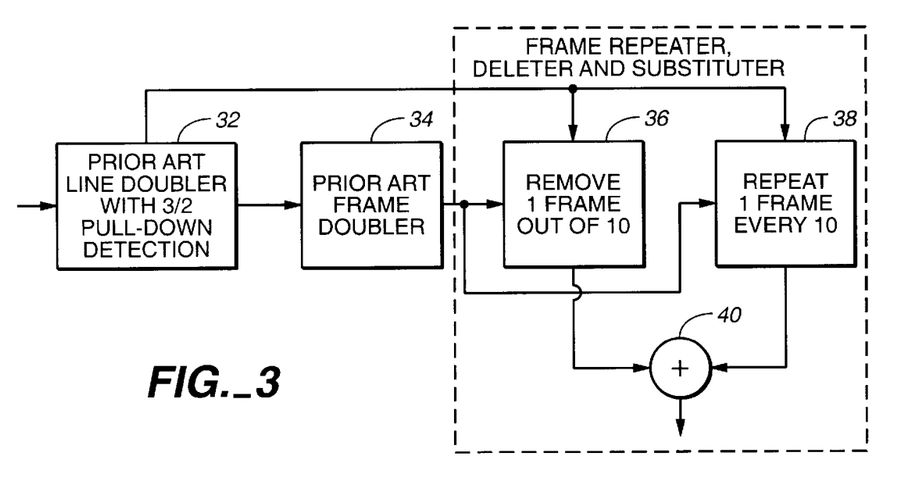
FIG. 3 is a functional block diagram of a first embodiment of the present invention as illustrated in FIGS. 2A–F.

FIG. 3 shows a functional block diagram of an embodiment for implementing the method shown in FIGS. 2A–F. The input video, which may be 60 Hz 2-1 interlaced video, preferably is applied to a line doubler 32 of the prior art field-merge type, which, for film sources, merges the interlaced fields in order to provide a 60 Hz progressively scanned video signal, thereby increasing the number of lines and functioning as an interlace-to-progressive scan converter. Line doubler 32 includes 3-2 pull down detection and also provides a 3-2 sequence marker signal as shown in FIG. 2C. The line doubled 60 Hz progressively scanned signal is applied to a prior art frame doubler 34, which generates a 120 Hz frame rate video signal (FIG. 2B). The 3-2 pull down sequence is present in the outputs of blocks 32 and 34. Under control of the 3-2 sequence marker, block 36 receives the 120 Hz signal and blanks or removes every tenth frame, namely, the first frame following the sequence marker in order to produce the video stream shown in FIG. 2D. Also under control of the 3-2 sequence marker, block 38 receives the 120 Hz signal, delays every frame and repeats the frame preceding the sequence marker in order to produce the video stream shown in FIG. 2E. The video streams from blocks 36 and 38 are applied to an additive combiner 40 which provides the 120 Hz progressively scanned video output in which five 120 Hz frames display every motion picture film frame.

Figure 4A:
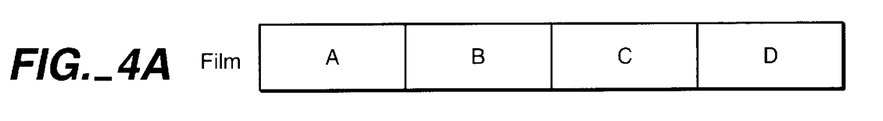
FIGS. 4A–E are idealized timing information charts useful in understanding the operation of a second embodiment of the present invention for a nominally 120 Hz display.
Figure 4B:
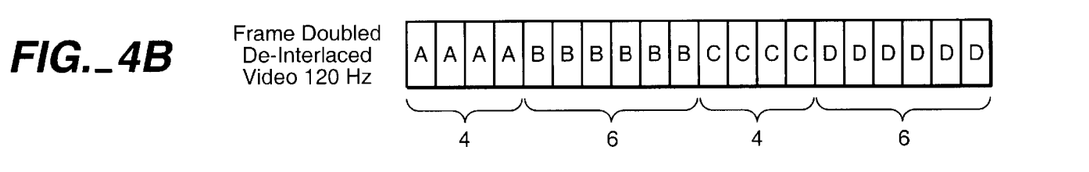
Figure 4C:
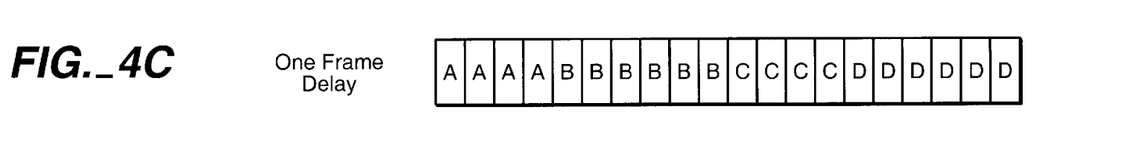
Figure 4D:
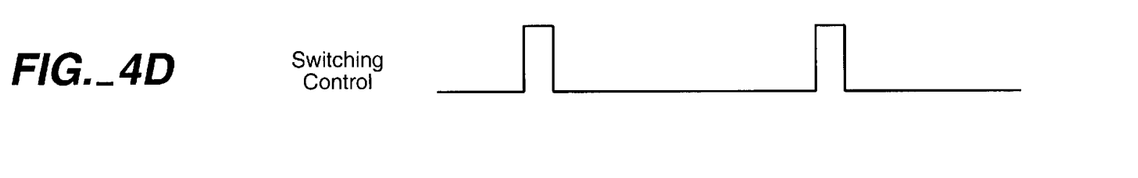
Figure 4E:
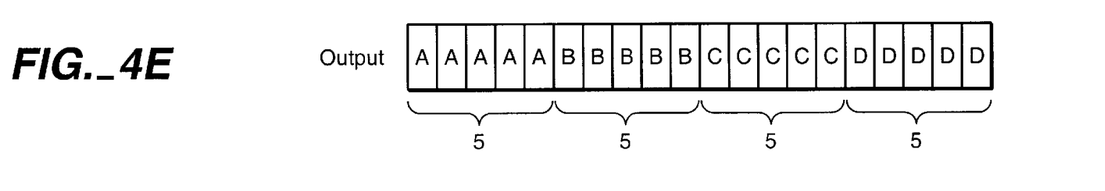

The sequence of FIGS. 4A–4E explain a second embodiment of the present invention in which equal film frame display times are achieved in a 120 Hz frame rate video signal. FIGS. 4A and 4B correspond to FIGS. 1A and 1D and are repeated for simplicity in presentation. FIG. 4C is the video stream of FIG. 4B delayed by one video frame. Recognition of the 3-2 (6-4) film pulldown pattern allows a switching control waveform (FIG. 4D) to select one frame from the delayed video stream of FIG. 4C during the first frame of the six identical frames of the 6-4 sequence and to select the other video stream during all other frames. Thus, the selections yield the video stream of FIG. 4E, a frame doubled video stream in which there are the same number of video frames for every film frame. The resulting 5- 5 pattern provides 1/24 second display for every film frame (each film frame is carried by five video frames).

Figure 5:
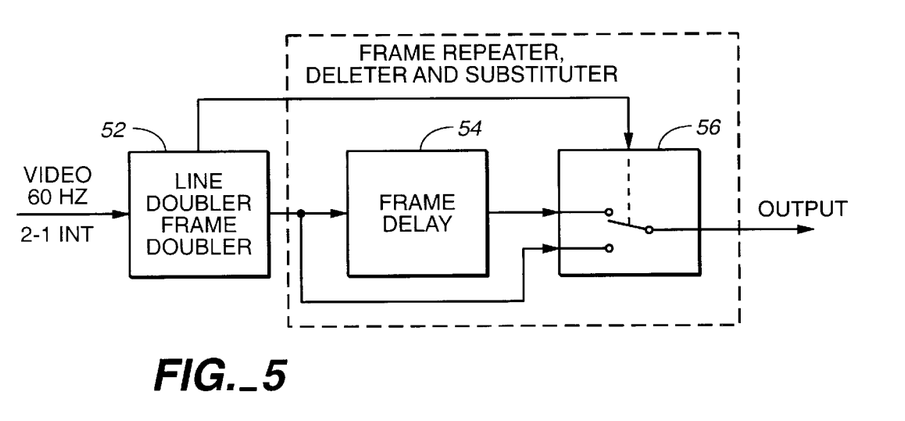
FIG. 5 is a functional block diagram of a second embodiment of the present invention as illustrated in FIGS. 4A–E.

FIG. 5 shows a functional block diagram for implementing the approach shown in FIGS. 4A–E. The input 60 Hz 2-1 interlaced video is applied to a prior art combination line doubler and frame doubler 52, which, for film sources, preferably merges the interlaced fields in order to provide a 60 Hz progressively scanned video signal and then doubles the frame rate to provide a 120 Hz progressively scanned video signal (FIG. 4B). The line doubler and frame doubler 52 includes 3-2 pull down detection and also provides a switching waveform (FIG. 4D) based on the 3-2 (6-4) sequence. The line doubled, frame doubled video stream output of device 52 is applied to a one 120 Hz frame delay 54 whose output is the delayed 120 Hz video stream of FIG. 4C and to a single-pole double throw switch 56 (shown schematically; in practice the switch is implemented electronically or in software). The output of switch 56 is a 120 Hz frame rate video signal having the desired 5- 5 pattern providing a 1/24 second display for every film frame (each film frame is carried by five video frames).

As mentioned above, the invention is also applicable to displays at nominal frame rates of 72 Hz and 96 Hz.

Figure 6A:
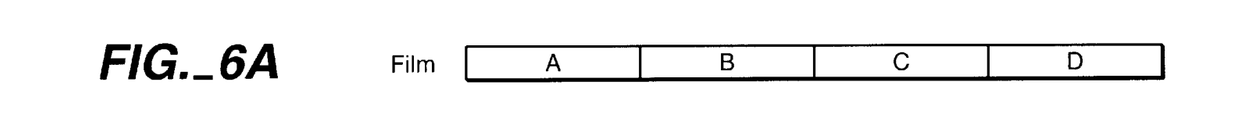
FIGS. 6A–E are idealized timing information charts useful in understanding the operation of the present invention for a nominally 72 Hz display.
Figure 6B:
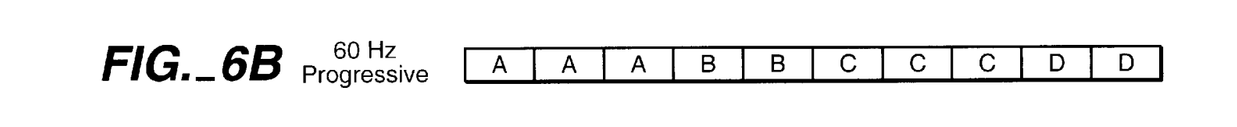

The sequence of FIGS. 6A–6E explain a first embodiment of the present invention in which equal film frame display times are achieved in a 72 Hz frame rate video signal. FIGS. 6A and 6B correspond to FIGS. 1A and 1C and are repeated for simplicity in presentation. In this first embodiment for a 72 Hz environment, it is not necessary to frame double to 120 Hz. The interlaced-to-progressive scan converted video signal of FIG. 6B, which maintains the 3-2 pull down sequence, is converted to a 72 Hz frame rate by time compressing each 1/60 second frame in a five frame sequence to a 1/72 second frame followed by a blank 1/72 second period to provide the video stream shown in FIG. 6C. That video stream is delayed by one 72 Hz frame period to provide the video stream of FIG. 6D. By switching between the video streams of FIGS. 6C and 6D, an output video stream (FIG. 6E) is obtained in which every film frame is represented by three 72 Hz video frames, thus displaying every film frame for 1/24 seconds, the display rate of the original film frame.

Figure 6C:
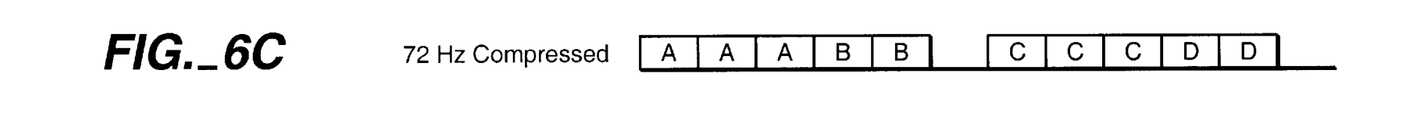
Figure 6D:
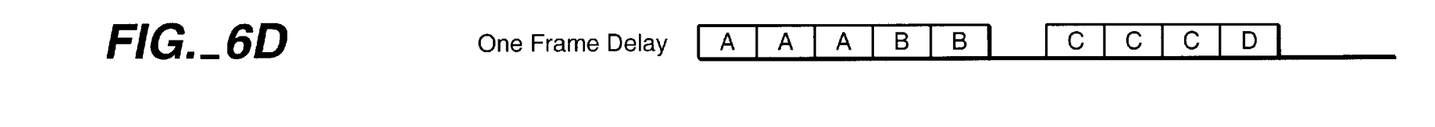
Figure 6E:
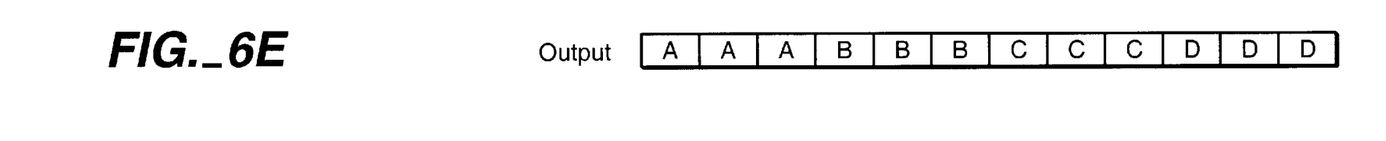
Figure 7:
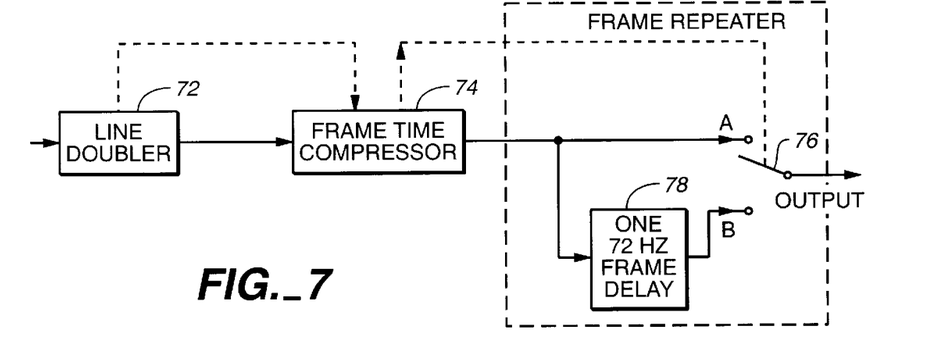
FIG. 7 is a functional block diagram of a first embodiment of the present invention as illustrated in FIGS. 6A–E.

FIG. 7 shows a functional block diagram for implementing the approach shown in FIGS. 6A–E. The input 60 Hz 2-1 interlaced video is applied to a prior art line doubler 72, which, for film sources, preferably merges the interlaced fields in order to provide a 60 Hz progressively scanned video signal. Line doubler 72 includes 3-2 pull down detection and also provides a timing signal. The converted 60 Hz progressively scanned signal is applied to a prior art frame compressor 74, which generates a 72 Hz progressively scanned video signal in which every sixth frame period is blank (FIG. 6C). The 3-2 pull down sequence is present in the outputs of blocks 72 and 74. Under control of the timing signal, the frame compressor 74 time compresses (using time delay as necessary) each 3-2 pulldown sequence of five 1/60 second input frame to a sequence of six 1/72 second frames: five 72 Hz frames carrying information, the five compressed 60 Hz frames followed by a blank 72 Hz frame (FIG. 6C). That video steam is applied to one pole (A) of a switch 76 (shown schematically; in practice the switch is implemented electronically or in software) and to a one 72 Hz frame delay 78. The delay 78 output (FIG. 6D) is applied to the other pole (B) of switch 76. The switching control signal, produced by the frame compressor 74, causes switch 76 to select the video stream at the A position (FIG. 6C) at all times except during the blank frame when it causes switch 76 to select the delayed video stream at the B position (FIG. 6D), thus providing at the output the desired 3-3 sequence video stream (FIG. 6E) in which three 72 Hz frames display every motion picture frame.

Alternatively, the desired 72 Hz video stream may be derived from a converted 120 Hz video stream such as is produced in the embodiments of FIGS. 4–5. For example, a 120 Hz video stream such as that of FIG. 4E may be converted to a 72 Hz video stream having three video frames for each film frame by discarding two frames of every five consecutive 120 Hz frames and time expanding the remaining three frames.

Figure 11:
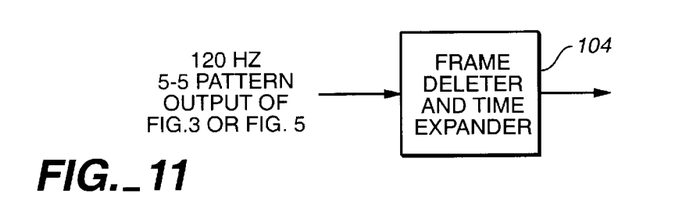
FIG. 11 is a functional block diagram of an embodiment of the invention providing 72 Hz or 96 Hz display.

FIG. 11 shows a functional block diagram of an embodiment for implementing the just described method. The 120 Hz 5- 5 pattern output of the embodiments of FIG. 3 or FIG. 5 is applied to a frame deleter and time expander 104.

Figure 8A:
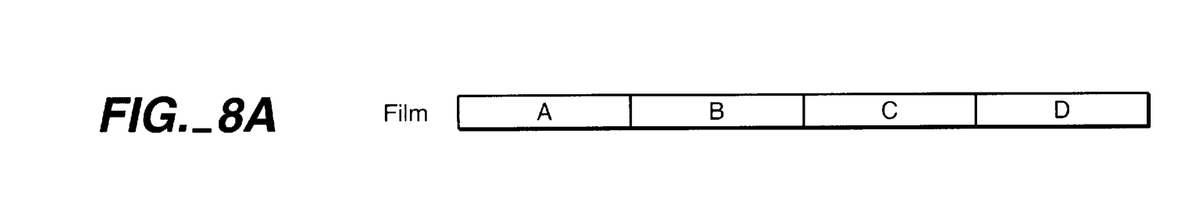
FIGS. 8A–F are idealized timing information charts useful in understanding the operation of the present invention for a nominally 96 Hz display.
Figure 8B:
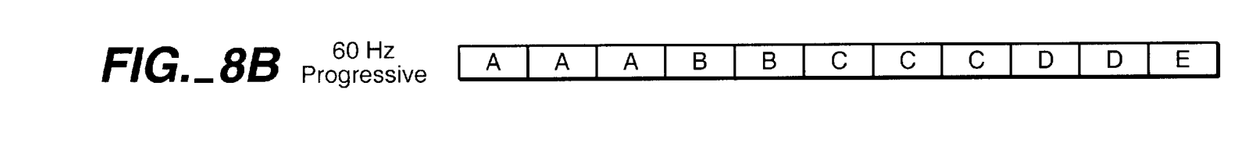

The sequence of FIGS. 8A–8F explain a first embodiment of the present invention in which equal film frame display times are achieved in a 96 Hz frame rate video signal. FIGS. 8A and 8B correspond to FIGS. 1A and 1C and are repeated for simplicity in presentation. In this first embodiment for a 96 Hz environment, it is not necessary to frame double to 120 Hz. The interlaced-to-progressive scan converted video signal of FIG. 8B, which maintains the 3-2 pull down sequence, is converted to a 96 Hz frame rate by time compressing each 1/60 second frame in a five frame sequence to a 1/96 second frame in which three blank 1/96 second periods occur, providing the video stream shown in FIG. 8C. That video stream is delayed by one 96 Hz frame period to provide the video stream of FIG. 8D and that video stream is delayed by a further one 96 Hz frame period to provide the video stream of FIG. 8E. By switching among the video streams of FIGS. 8C, 8D and 8E, an output video stream (FIG. 8E) is obtained in which every film frame is represented by four 96 Hz video frames, thus displaying every film frame for 1/24 seconds, the display rate of the original film frame.

Figure 8C:
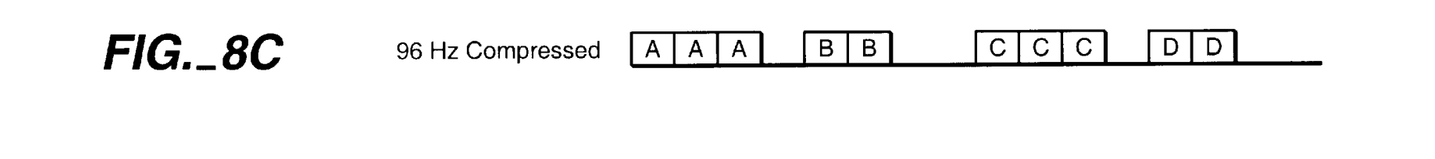
Figure 8D:
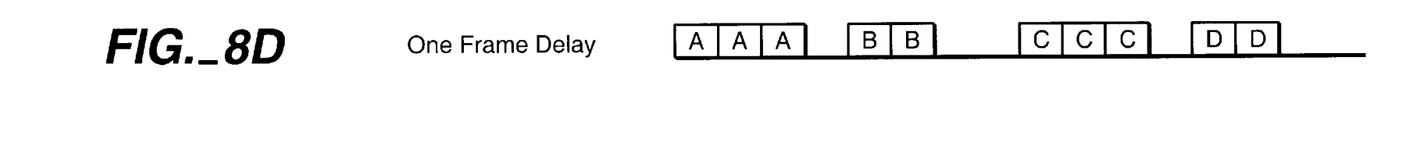
Figure 8E:
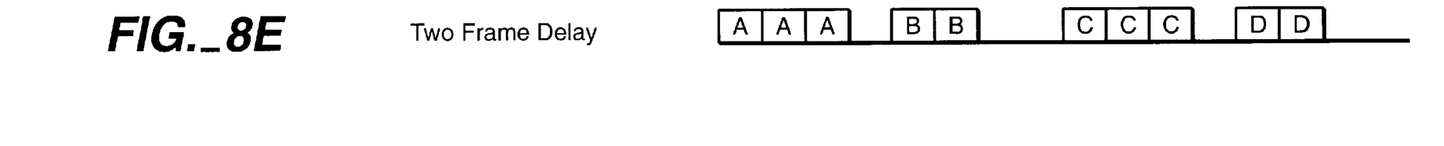
Figure 8F:
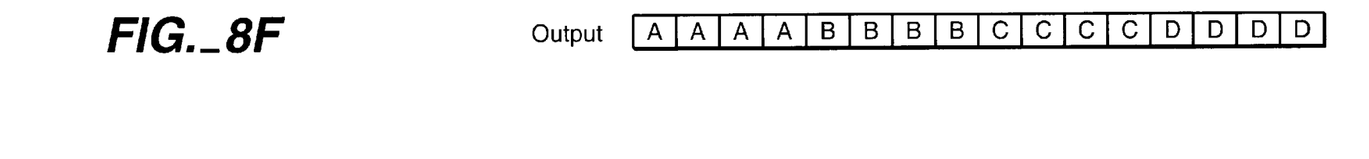
Figure 9:
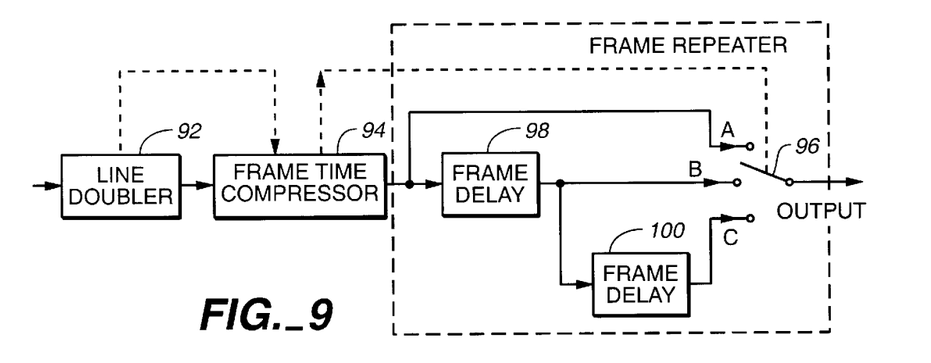
FIG. 9 is a functional block diagram of a first embodiment of the present invention as illustrated in FIGS. 8A–F.

FIG. 9 shows a functional block diagram for implementing the approach shown in FIGS. 8A–8F. The input 60 Hz 2-1 interlaced video is applied to a prior art line doubler 92, which, for film sources, preferably merges the interlaced fields in order to provide a 60 Hz progressively scanned video signal. Line doubler 92 includes 3-2 pull down detection and also provides a timing signal. The converted 60 Hz progressively scanned signal is applied to a prior art frame compressor 94, which generates a 96 Hz progressively scanned video signal in which every fourth, seventh and eighth frame period is blank (FIG. 8C). The 3-2 pull down sequence is present in the outputs of blocks 92 and 94. Under control of the timing signal, the frame compressor 94 time compresses (using time delay as necessary) each 3-2 pull-down sequence of five 1/60 second input frame to a sequence of eight 1/96 second frames: five 96 Hz frames carrying the information and three blank 96 Hz frames (FIG. 8C). That video steam is applied to one pole (A) of a switch 96 and to a one 96 Hz frame delay 98. The delay 98 output (FIG. 8D) is applied to a second pole (B) of switch 96 and to a further one 96 Hz frame delay 100, the output of which is applied to the third pole (C) of switch 96. The switching control signal, produced by the frame compressor 94, causes switch 96 to select the video stream at the A position (FIG. 8C) at all times except during the first blank frame in a sequence when it causes switch 96 to select the one frame delayed video stream at the B position (FIG. 8D) and during the third and fourth blank frames in a sequence when it causes switch 96 to select the two frame delayed video stream at the C position (FIG. 8E), thus providing at the output the desired 4-4 sequence video stream (FIG. 6E). Switch 96 is shown schematically; in practice the switch is implemented electronically or in software.

Alternatively, the desired 96 Hz video stream may be derived from a converted 120 Hz video stream such as is produced in the embodiments of FIGS. 4–5. For example a 120 Hz video stream such as that of FIG. 1D may be converted to a 96 Hz video stream having three video frames for each film frame by discarding one frame of every five consecutive 120 Hz frames and time expanding the remaining four frames.

FIG. 11 shows a functional block diagram of an embodiment for implementing the just described method. For the case of this 96 Hz embodiment, the frame deleter and time expander 104 also receives the output of the embodiments of FIG. 3 or FIG. 5.

The present invention may be implemented using analog, digital, hybrid analog/digital and/or digital signal processing in which functions are performed in software and/or firmware. Digital equivalents of analog devices may be employed (for example, a digitally delay in place of an analog delay).

What is claimed is:

1. Apparatus for converting film-originated nominally 60 Hz frame rate progressively scanned video signals having a 3-2 pulldown pattern for 120 Hz frame rate progressive scan display without motion discontinuities, comprising a 60 Hz to 120 Hz frame rate doubler receiving the film-originated video signal and putting out a 120 Hz video signal maintaining the 3-2 pulldown pattern as a 6-4 pattern, and a frame repeater, deleter and substituter that deletes the first or last one of the frames in each of the six frame sequences and repeats and substitutes therefore one of the adjacent frames in each of the adjacent four frame sequences, whereby a 120 Hz video signal results having a 5-5 pattern in which the display time of each film frame is the same.

2. Apparatus for converting film-originated nominally 60 Hz frame rate progressively scanned video signals having a 3-2 pulldown pattern for 72 Hz frame rate progressive scan display without motion discontinuities, comprising a 60 Hz to 120 Hz frame rate doubler receiving the film-originated video signal and putting out a 120 Hz video signal maintaining the 3-2 pulldown pattern as a 6-4 pattern, and a frame deleter and expander that deletes four frames in each of the ten frame 6-4 sequences, namely one frame of the four sequence portion and three frames of the six sequence portion, and time expands the remaining six frames from $1/120$ seconds each to $1/72$ seconds each, whereby a 72 Hz video signal results having a 3-3 pattern in which the display time of each film frame is the same.

3. Apparatus for converting film-originated nominally 60 Hz frame rate progressively scanned video signals having a 3-2 pulldown pattern for 96 Hz frame rate progressive scan display without motion discontinuities, comprising a 60 Hz to 120 Hz frame rate doubler receiving the film-originated video signal and putting out a 120 Hz video signal maintaining the 3-2 pulldown pattern as a 6-4 pattern, and a frame deleter and expander that deletes two of the frames in each of the ten frame 6-4 sequences, namely two frames in the six sequence portion, and expands the remaining eight frames from $1/120$ seconds each to $1/96$ seconds each, whereby a 96 Hz video signal results having a 4-4 pattern in which the display time of each film frame is the same.

4. Apparatus for converting film-originated nominally 60 Hz frame rate progressively scanned video signals having a 3-2 pulldown pattern for 72 Hz frame rate progressive scan display without motion discontinuities, comprising a frame repeater that repeats one of the frames in the 2 sequence portion of the 3-2 sequence, and a time compressor that compresses each frame in a five frame 3-2 sequence from $1/60$ to $1/72$ seconds, whereby a 72 Hz video signal results having a 3-3 pattern in which the display time of each film frame is the same.

5. Apparatus for converting film-originated nominally 60 Hz frame rate progressively scanned video signals having a 3-2 pulldown pattern for 96 Hz frame rate progressive scan display without motion discontinuities, comprising a frame repeater that repeats two of the frames in the 2 sequence portion of the 3-2 sequence and one of the frames in 3 sequence portion of the 3-2 sequence, and a time compressor that compresses each frame in a five frame 3-2 sequence from $1/60$ to $1/96$ seconds, whereby a 96 Hz video signal results having a 4-4 pattern in which the display time of each film frame is the same.

6. A method for converting film-originated nominally 60 Hz frame rate progressively scanned video signals having a 3-2 pulldown pattern for 120 Hz frame rate progressive scan display without motion discontinuities, comprising frame rate doubling the film-originated video signal from 60 Hz to 120 Hz while maintaining the 3-2 pulldown pattern as a 6-4 pattern, and deleting the first or last one of the frames in each of the six frame sequences and repeating and substituting therefore one of the adjacent frames in each of the adjacent four frame sequences, whereby a 120 Hz video signal results having a 5-5 pattern in which the display time of each film frame is the same.

7. A method Apparatus for converting film-originated nominally 60 Hz frame rate progressively scanned video signals having a 3-2 pulldown pattern for 72 Hz frame rate progressive scan display without motion discontinuities, comprising frame rate doubling the film-originated video signal from 60 Hz to 120 Hz while maintaining the 3-2 pulldown pattern as a 6-4 pattern, and deleting four frames in each of the ten frame 6-4 sequences, namely one frame of the four sequence portion and three frames of the six sequence portion, and time expanding the remaining six frames from $1/120$ seconds each to $1/72$ seconds each, whereby a 72 Hz video signal results having a 3-3 pattern in which the display time of each film frame is the same.

8. A method for converting film-originated nominally 60 Hz frame rate progressively scanned video signals having a 3-2 pulldown pattern for 96 Hz frame rate progressive scan display without motion discontinuities, comprising frame rate doubling the film-originated video signal from 60 Hz to 120 Hz while maintaining the 3-2 pulldown pattern as a 6-4 pattern, and deleting two of the frames in each of the ten frame 6-4 sequences, namely two frames in the six sequence portion, and expanding the remaining eight frames from $\frac{1}{120}$ seconds each to $\frac{1}{96}$ seconds each, whereby a 96 Hz video signal results having a 4-4 pattern in which the display time of each film frame is the same.

9. A method for converting film-originated nominally 60 Hz frame rate progressively scanned video signals having a 3-2 pulldown pattern for 72 Hz frame rate progressive scan display without motion discontinuities, comprising repeating one of the frames in the 2 sequence portion of the 3-2 sequence, and time compressing each frame in a five frame 3-2 sequence from $\frac{1}{60}$ to $\frac{1}{72}$ seconds, whereby a 72 Hz video signal results having a 3-3 pattern in which the display time of each film frame is the same.

10. A method converting film-originated nominally 60 Hz frame rate progressively scanned video signals having a 3-2 pulldown pattern for 96 Hz frame rate progressive scan display without motion discontinuities, comprising repeating two of the frames in the 2 sequence portion of the 3-2 sequence and one of the frames in 3 sequence portion of the 3-2 sequence, and time compressing each frame in a five frame 3-2 sequence from $\frac{1}{60}$ to $\frac{1}{96}$ seconds, whereby a 96 Hz video signal results having a 4-4 pattern in which the display time of each film frame is the same.

11. Apparatus for converting film-originated nominally 60 Hz frame rate interlaced video signals having a 3-2 pull-down pattern for 120 Hz frame rate progressive scan display without motion discontinuities, comprising a 60 Hz 2-1 interlaced to 60 Hz progressive scan converter receiving the film-originated video signal and putting out a 60 Hz progressively scanned video signal maintaining the 3-2 pulldown pattern, a 60 Hz to 120 Hz frame rate doubler receiving the 60 Hz progressively scanned video signal and putting out a 120 Hz progressively scanned video signal maintaining the 3-2 pulldown pattern as a 6-4 pattern, and a frame repeater, deleter and substituter that deletes the first or last one of the frames in each of the six frame sequences and repeats and substitutes therefore one of the adjacent frames in each of the adjacent four frame sequences, whereby a 120 Hz video signal results having a 5-5 pattern in which the display time of each film frame is the same.

12. Apparatus for converting film-originated nominally 60 Hz frame rate interlaced video signals having a 3-2 pull-down pattern for 72 Hz frame rate progressive scan display without motion discontinuities, comprising a 60 Hz 2-1 interlaced to 60 Hz progressive scan converter receiving the film-originated video signal and putting out a 60 Hz progressively scanned video signal maintaining the 3-2 pulldown pattern, a 60 Hz to 120 Hz frame rate doubler receiving the 60 Hz progressively scanned video signal and putting out a 120 Hz progressively scanned video signal maintaining the 3-2 pulldown pattern as a 6-4 pattern, and a frame deleter and expander that deletes four frames in each of the ten frame 6-4 sequences, namely one frame of the four sequence portion and three frames of the six sequence portion, and time expands the remaining six frames from $\frac{1}{120}$ seconds each to $\frac{1}{72}$ seconds each, whereby a 72 Hz video signal results having a 3-3 pattern in which the display time of each film frame is the same.

13. Apparatus for converting film-originated nominally 60 Hz frame rate interlaced video signals having a 3-2 pull-down pattern for 96 Hz frame rate progressive scan display without motion discontinuities, comprising a 60 Hz 2-1 interlaced to 60 Hz progressive scan converter receiving the film-originated video signal and putting out a 60 Hz progressively scanned video signal maintaining the 3-2 pulldown pattern, a 60 Hz to 120 Hz frame rate doubler receiving the 60 Hz progressively scanned video signal and putting out a 120 Hz progressively scanned video signal maintaining the 3-2 pulldown pattern as a 6-4 pattern, and a frame deleter and expander that deletes two of the frames in each of the ten frame 6-4 sequences, namely two frames in the six sequence portion, and expands the remaining eight frames from $\frac{1}{120}$ seconds each to $\frac{1}{96}$ seconds each, whereby a 96 Hz video signal results having a 4-4 pattern in which the display time of each film frame is the same.

14. Apparatus for converting film-originated nominally 60 Hz frame rate interlaced video signals having a 3-2 pull-down pattern for 72 Hz frame rate progressive scan display without motion discontinuities, comprising a 60 Hz 2-1 interlaced to 60 Hz progressive scan converter receiving the film-originated video signal and putting out a 60 Hz progressively scanned video signal maintaining the 3-2 pulldown pattern, and a frame repeater and compressor that compresses each frame in a five frame 3-2 sequence from $\frac{1}{60}$ to $\frac{1}{72}$ seconds and repeats one of the frames in the 2 sequence portion of the 3-2 sequence, whereby a 72 Hz video signal results having a 3-3 pattern in which the display time of each film frame is the same.

15. Apparatus for converting film-originated nominally 60 Hz frame rate interlaced video signals having a 3-2 pull-down pattern for 96 Hz frame rate progressive scan display without motion discontinuities, comprising a 60 Hz 2-1 interlaced to 60 Hz progressive scan converter receiving the film-originated video signal and putting out a 60 Hz progressively scanned video signal maintaining the 3-2 pulldown pattern, and a frame repeater and compressor that compresses each frame in a five frame 3-2 sequence from $\frac{1}{60}$ to $\frac{1}{96}$ seconds and repeats two of the frames in the 2 sequence portion of the 3-2 sequence and one of the frames in 3 sequence portion of the 3-2 sequence , whereby a 96 Hz video signal results having a 4-4 pattern in which the display time of each film frame is the same.

16. A method converting film-originated nominally 60 Hz frame rate interlaced video signals having a 3-2 pulldown pattern for 120 Hz frame rate progressive scan display without motion discontinuities, comprising interlace to progressive scan converting the 60 Hz interlaced film-originated video signal having a 3-2 pull-down pattern to a 60 Hz progressively scanned video signal maintaining the 3-2 pulldown pattern, frame rate doubling the 60 Hz progressively scanned video signal to a 120 Hz progressively scanned video signal maintaining the 3-2 pulldown pattern as a 6-4 pattern, and deleting the first or last one of the frames in each of the six frame sequences and repeating and substituting therefore one of the adjacent frames in each of the adjacent four frame sequences, whereby a 120 Hz video signal results having a 5- 5 pattern in which the display time of each film frame is the same.

17. A method for converting film-originated nominally 60 Hz frame rate interlaced video signals having a 3-2 pulldown pattern for 72 Hz frame rate progressive scan display without motion discontinuities, comprising interlace to progressive scan converting the 60 Hz interlaced film-originated video signal to a 60 Hz progressively scanned video signal maintaining the 3-2 pulldown pattern, frame rate doubling the 60 Hz progressively scanned video signal to a 120 Hz progressively scanned video signal maintaining the 3-2 pulldown pattern as a 6-4 pattern, and deleting four frames in each of the ten frame 6-4 sequences, namely one frame of the four sequence portion and three frames of the six sequence portion, and time expanding the remaining six frames from $\frac{1}{120}$ seconds each to $\frac{1}{72}$ seconds each, whereby a 72 Hz video signal results having a 3-3 pattern in which the display time of each film frame is the same.

18. A method for converting film-originated nominally 60 Hz frame rate interlaced video signals having a 3-2 pulldown pattern for 96 Hz frame rate progressive scan display without motion discontinuities, comprising interlace to progressive scan converting the 60 Hz interlaced film-originated video signal to a 60 Hz progressively scanned video signal maintaining the 3-2 pulldown pattern, frame rate doubling the 60 Hz progressively scanned video signal to a 120 Hz progressively scanned video signal maintaining the 3-2 pulldown pattern as a 6-4 pattern, and deleting two of the frames in each of the ten frame 6-4 sequences, namely two frames in the six sequence portion, and expanding the remaining eight frames from $\frac{1}{120}$ seconds each to $\frac{1}{96}$ seconds each, whereby a 96 Hz video signal results having a 4-4 pattern in which the display time of each film frame is the same.

19. A method for converting film-originated nominally 60 Hz frame rate interlaced video signals having a 3-2 pulldown pattern for 72 Hz frame rate progressive scan display without motion discontinuities, comprising interlace to progressive scan converting the 60 Hz interlaced film-originated video signal having a 3-2 pulldown pattern to a 60 Hz progressively scanned video signal maintaining the 3-2 pulldown pattern, and compressing each frame in a five frame 3-2 sequence from $\frac{1}{60}$ to $\frac{1}{72}$ seconds and repeating one of the frames in the 2 sequence portion of the 3-2 sequence, whereby a 72 Hz video signal results having a 3-3 pattern in which the display time of each film frame is the same.

20. A method for converting film-originated nominally 60 Hz frame rate interlaced video signals having a 3-2 pulldown pattern for 96 Hz frame rate progressive scan display without motion discontinuities, comprising interlace to progressive scan converting the 60 Hz interlaced film-originated video signal to a 60 Hz progressively scanned video signal maintaining the 3-2 pulldown pattern, and compressing each frame in a five frame 3-2 sequence from $\frac{1}{60}$ to $\frac{1}{96}$ seconds and repeating two of the frames in the 2 sequence portion of the 3-2 sequence and one of the frames in 3 sequence portion of the 3-2 sequence, whereby a 96 Hz video signal results having a 4-4 pattern in which the display time of each film frame is the same.

21. Apparatus for converting film-originated nominally 60 Hz frame rate progressively scanned video signals having a 3-2 pulldown pattern for 72 Hz frame rate progressive scan display without motion discontinuities, comprising a 60 Hz to 120 Hz frame rate doubler receiving the film-originated video signal and putting out a 120 Hz video signal maintaining the 3-2 pulldown pattern as a 6-4 pattern, a frame repeater, deleter and substituter that deletes the first or last one of the frames in each of the six frame sequences and repeats and substitutes therefore one of the adjacent frames in each of the adjacent four frame sequences, such that a 120 Hz video signal results having a 5-5 pattern in which the display time of each film frame is the same, and a frame deleter and expander that deletes two of every five consecutive 120 Hz frames and time expands the remaining three frames, whereby a 72 Hz video signal results having a 3-3 pattern in which the display time of each film frame is the same.

22. Apparatus for converting film-originated nominally 60 Hz frame rate progressively scanned video signals having a 3-2 pulldown pattern for 96 Hz frame rate progressive scan display without motion discontinuities, comprising a 60 Hz to 120 Hz frame rate doubler receiving the film-originated video signal and putting out a 120 Hz video signal maintaining the 3-2 pulldown pattern as a 6-4 pattern, a frame repeater, deleter and substituter that deletes the first or last one of the frames in each of the six frame sequences and repeats and substitutes therefore one of the adjacent frames in each of the adjacent four frame sequences, such that a 120 Hz video signal results having a 5-5 pattern in which the display time of each film frame is the same, and a frame deleter and expander that deletes one of every five consecutive 120 Hz frames and time expands the remaining four frames, whereby a 96 Hz video signal results having a 4-4 pattern in which the display time of each film frame is the same.

23. A method for converting film-originated nominally 60 Hz frame rate progressively scanned video signals having a 3-2 pulldown pattern for 72 Hz frame rate progressive scan display without motion discontinuities, comprising frame rate doubling the film-originated video signal from 60 Hz to 120 Hz while maintaining the 3-2 pulldown pattern as a 6-4 pattern, deleting the first or last one of the frames in each of the six frame sequences and repeating and substituting therefore one of the adjacent frames in each of the adjacent four frame sequences, such that a 120 Hz video signal results having a 5- 5 pattern in which the display time of each film frame is the same, and deleting two of every five consecutive 120 Hz frames and time expanding the remaining three frames, whereby a 72 Hz video signal results having a 3-3 pattern in which the display time of each film frame is the same.

24. Apparatus for converting film-originated nominally 60 Hz frame rate progressively scanned video signals having a 3-2 pulldown pattern for 96 Hz frame rate progressive scan display without motion discontinuities, comprising frame rate doubling the film-originated video signal from 60 Hz to 120 Hz while maintaining the 3-2 pulldown pattern as a 6-4 pattern, deleting the first or last one of the frames in each of the six frame sequences and repeating and substituting therefore one of the adjacent frames in each of the adjacent four frame sequences, such that a 120 Hz video signal results having a 5-5 pattern in which the display time of each film frame is the same, and deleting one of every five consecutive 120 Hz frames and time expanding the remaining four frames, whereby a 96 Hz video signal results having a 4-4 pattern in which the display time of each film frame is the same.

* * * * *